(12) United States Patent
Ratnakar

(10) Patent No.: US 6,278,432 B1
(45) Date of Patent: Aug. 21, 2001

(54) IMAGE DELIVERY AND DISPLAY SYSTEM

(75) Inventor: Viresh Ratnakar, Sunnyvale, CA (US)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/096,719

(22) Filed: Jun. 11, 1998

(51) Int. Cl.[7] ................................................. G09G 5/00
(52) U.S. Cl. ............................ 345/112; 345/434; 345/428
(58) Field of Search ................................. 345/428, 356, 345/121, 112, 343, 434, 418, 430, 118; 707/526; G06T 1/00

(56) References Cited

U.S. PATENT DOCUMENTS

| | | |
|---|---|---|
| 4,405,943 | 9/1983 | Kanaly . |
| 4,494,144 | 1/1985 | Brown . |
| 4,499,491 | 2/1985 | Aron et al. . |
| 4,630,065 | 12/1986 | Ichikawa . |
| 4,660,037 | 4/1987 | Nakamura . |
| 4,876,651 | 10/1989 | Dawson et al. . |
| 4,972,319 | 11/1990 | Delorme . |
| 5,057,835 | 10/1991 | Factor et al. . |
| 5,127,056 | 6/1992 | Storaasli . |
| 5,245,413 | 9/1993 | Teichner et al. . |
| 5,321,750 | * 6/1994 | Nadan ...................................... 380/20 |
| 5,459,477 | 10/1995 | Fukuda et al. . |
| 5,870,564 | * 2/1999 | Jensen ................................ 395/200.7 |
| 5,968,120 | * 10/1999 | Guadalia ............................... 345/428 |
| 5,987,245 | * 11/1999 | Gish ..................................... 395/680 |
| 5,999,972 | * 12/1999 | Gish ..................................... 709/219 |
| 6,012,072 | * 1/2000 | Lucas .................................... 707/526 |

* cited by examiner

*Primary Examiner*—Matthew Luu
*Assistant Examiner*—Wesner Sajous
(74) *Attorney, Agent, or Firm*—Michael T. Gabrik

(57) ABSTRACT

An image delivery and display system embodying a technique for displaying on a client computer of a client-server network a portion of an image stored on the server. Upon receiving a request from the client computer specifying particular x, y coordinates, the server decompresses the image to extract the area of interest, partitions the image area into tiles and extracts the tile containing the x, y coordinates and a certain number of surrounding tiles, recompresses those tiles and transmits those tiles to the client computer. The tile containing the x, y coordinates is extracted, recompressed and transmitted first followed by the surrounding tiles in spiral order. The client computer then decompresses and displays the tiles in that same order.

13 Claims, 5 Drawing Sheets

IMAGE DELIVERY AND DISPLAY SYSTEM

BACKGROUND OF THE INVENTION

1. Field of the Invention

This invention relates generally to an image delivery and display system, and more particularly to a technique for retrieving tiled image data that may be used, for example, in connection with a client-server network, wherein a center tile of the requested image is transmitted and displayed on the client computer first followed by the surrounding tiles in spiral order.

2. Description of the Related Art

In a client-server network, the server is a relatively large computer which manages files and databases for smaller client computers and also controls the interconnecting networks. A client-server network may be used, for example, in connection with a navigation system wherein a stationary server computer stores a street map covering the entire United States and a client computer on-board a vehicle accesses some portion of that map by specifying certain x, y map coordinates.

Upon receiving the specified x, y coordinates from the client computer, the server (which typically stores the map image in compressed form) decompresses the map image, partitions the image into tiles, extracts the tile containing the x, y coordinates and a certain number of surrounding tiles, recompresses those tiles and transmits this map data to the client computer. Upon receiving the compressed map data, the client computer decompresses the data and displays the map on the screen. The problem is that the tiles are typically decompressed and displayed from left to right, top to bottom, as indicated by the arrows on the tiled map image 11 shown in FIG. 1. Since the tile containing the x, y coordinates is in or near the middle, some time elapses before the client computer actually displays the tile containing the x, y coordinates, which is the tile of most interest to the operator of the vehicle.

Various proposals have been made for capturing, storing, transmitting and/or displaying images in connection with on-board navigation or display systems and/or map generating systems. However, none of these proposals solve the aforementioned problem.

In U.S. Pat. Nos. 4,630,065 and 4,660,037, devices have been developed for visually indicating the current location of an automotive vehicle. A mechanism assesses the coordinates of the moving vehicle using its direction and distance traveled, and displays the vehicle coordinates along with a map of the region. In the first patent, a series of local maps of an extended area are stored on microfilm as a photographic image collection and are individually available for viewing on a display. In the second patent, the map image information of the extended area is stored in digital form such that a portion of the map may be accessed for viewing.

On-board navigation systems have also been proposed for use in connection with aircraft. One such system is set forth in U.S. Pat. No. 5,057,835. The map and text display system proposed therein offers several "functionality" features such as conditional display of text, runway orientations, etc. Another such system has been proposed in U.S. Pat. No. 4,405,943. This patent provides a low bandwidth video imaging and transmission system that is used with a remotely piloted vehicle. High resolution images are captured in real time using a camera on an aircraft and then transferred to a memory aboard the aircraft. To reduce bandwidth, only a selected portion of the image is retrieved from ground as high resolution data; the remaining portion is retrieved as low resolution data. Another digital map display system for an aircraft is set forth in U.S. Pat. No. 4,876,651. This system includes a mass memory unit and a cache memory with display and map data transfer occurring in parallel.

Another patent directed to an electronic global map generating system is U.S. Pat. No. 4,972,319. The system therein uses a hierarchical tiling scheme. Map data is organized into a hierarchy of successive magnitudes for storage and presentation of map images at various resolutions.

However, none of these patents teach or suggest a tiled-image delivery and display system with a spirally rendered presentation of the tiles beginning with a center tile.

OBJECTS OF THE INVENTION

It is therefore an object of this invention to overcome the aforementioned problems with image delivery and display systems.

It is another object of this invention to provide an access mechanism which retrieves a center tile of a tiled-image first followed by the other tiles in a spiral order.

It is still another object of this invention to provide an image delivery and display system for more efficiently transferring map imagery over a network in a tiled manner.

SUMMARY OF THE INVENTION

According to one aspect of the invention, a method of delivering image data, such as map image data, from a storage system to a display is provided. The method comprises the steps of: requesting, for display, at least a portion of the image stored in the storage system by specifying coordinates defining a location in requested image; partitioning the image into a plurality of tiles including a middle tile containing the location defined by the specified coordinates and a plurality of surrounding tiles; extracting the middle tile first followed by a plurality of surrounding tiles; and displaying the requested image, wherein the middle tile is displayed first followed by the plurality of surrounding tiles in spiral order.

The method may be embodied in a computer-usable medium such as software or hardware and may carried out on a computer system or client-server network.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

Figure 1:
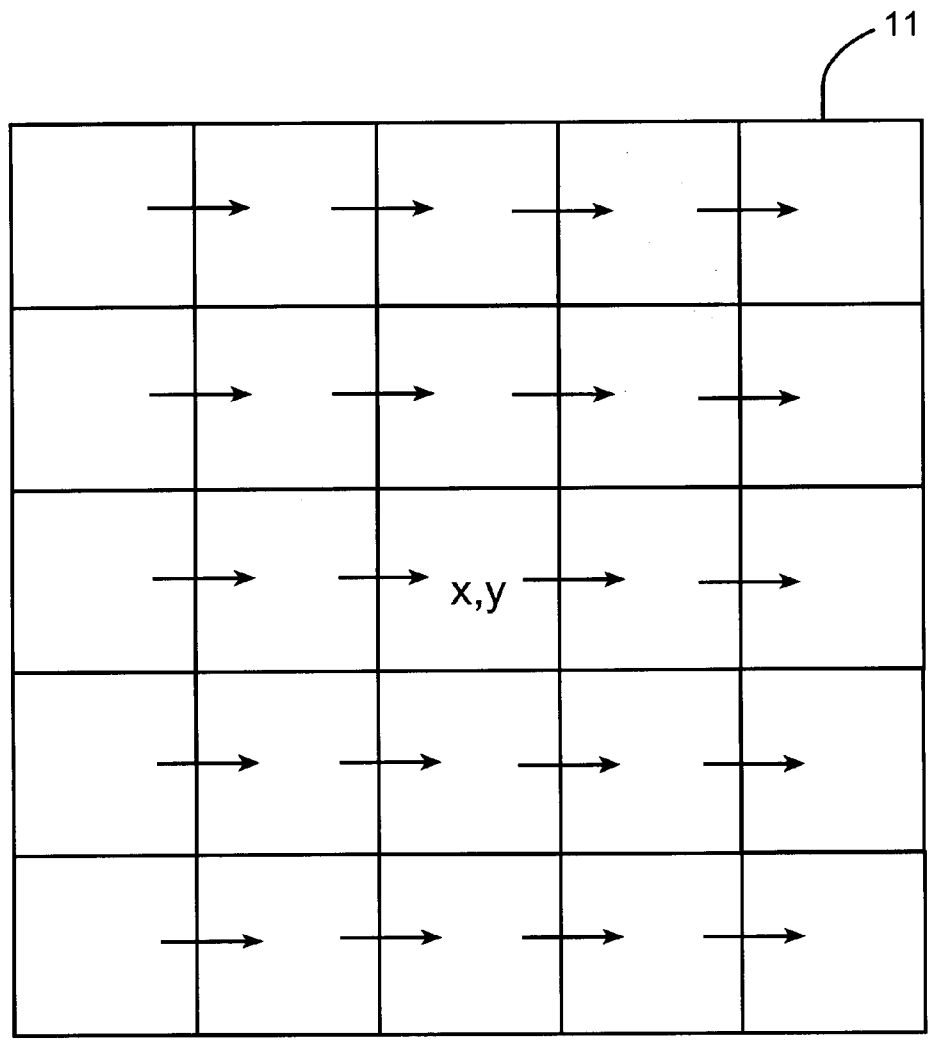
FIG. 1 is a schematic diagram showing the order in which tiled image data is conventionally transmitted and displayed.
Figure 2:
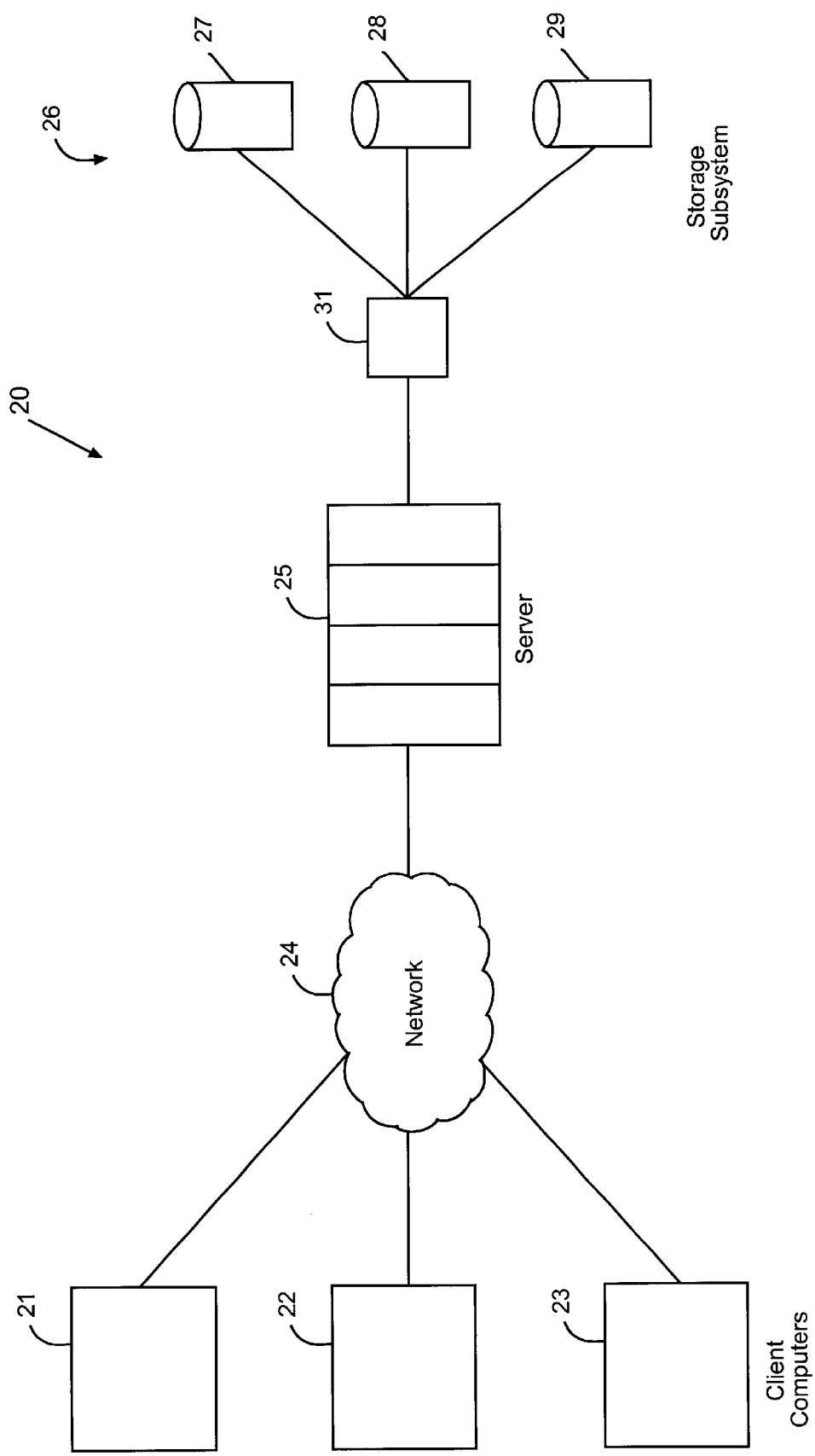
FIG. 2 schematically illustrates a client-server computer system for use in connection with the invention.

Referring to FIG. 2, a client-server computer system 20 is depicted. The system 20 includes a plurality of personal computer systems, identified by the reference numerals 21, 22 and 23, which are connected to a telecommunications network 24 that delivers data from a more powerful computer system known as a server 25 where data is stored in a disk storage subsystem 26. The subsystem 26 includes storage devices 27, 28, 29 and a data processor 31 for packaging the data for efficient storage and retrieval.

Figure 3:
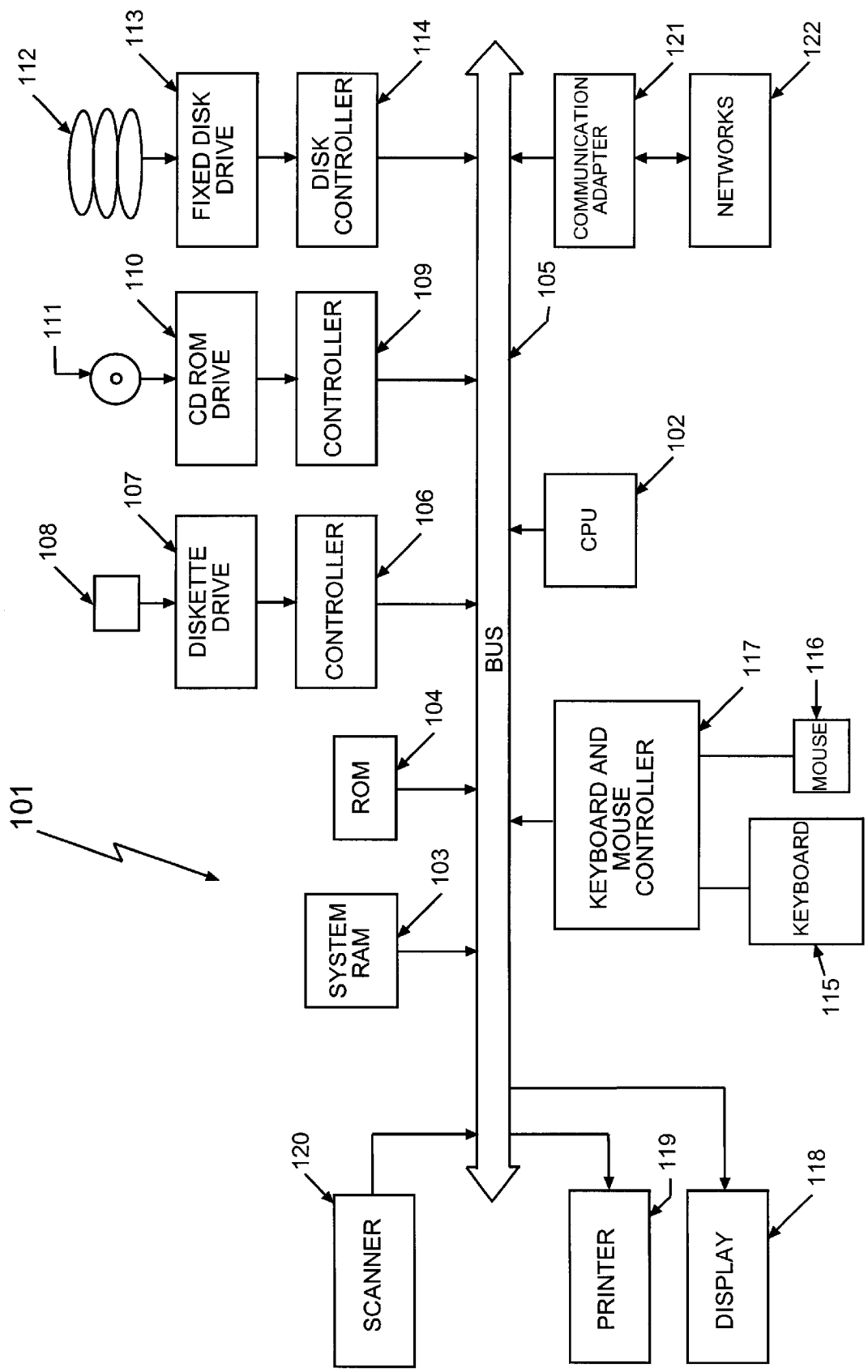
FIG. 3 is schematic illustration of a computer system on which the present invention may be implemented.

A more detailed block diagram illustration of a computer which may be used in connection with the invention is shown in FIG. 3. The computer, identified generally by reference numeral 101, may be of any suitable type such as a main frame or personal computer and depicts an architecture that is representative of either a client computer or server. Computer 101 comprises a central processing unit (CPU) 102 which may be a conventional microprocessor, a random access memory (RAM) 103 for temporary storage of information, and a read only memory (ROM) 104 for permanent storage of information. Each of these components is coupled to a bus 105. Operation of the computer 101 is typically controlled and coordinated by operating system software. The operating system, which is embodied in the system memory and runs on CPU 102, coordinates the operation of computer system 101 by controlling allocation of system resources and performing a variety of tasks, such as processing, memory management, networking and I/O functions, among others.

Also coupled to bus 105 by a controller 106 is a diskette drive 107 into which a non-volatile mass storage device such as a diskette 108 may be inserted. Similarly, a controller 109 interfaces between bus 105 and a compact disc (CD) ROM drive 110 which is adapted to receive a CD ROM 111. A hard disk 112 is provided as part of a fixed disk drive 113 which is coupled to bus 105 by a disk controller 114.

A keyboard 115 and mouse 116, which are coupled to bus 105 via a controller 117, facilitate the input of data and otherwise provide a means for entering information into computer 101. Computer 101 also includes a display 118 and may further include a variety of peripheral devices such as a printer 119 and a scanner 120.

Referring to FIGS. 2 and 3, in accordance with the invention, map image data is transferred to client computer 21, 22 and/or 23 from the remotely located server 25. Thus, each of these computers 21, 22 and 23 as well as the server 25, as illustrated on computer 101, include a communications adapter 121 which enables communication across networks 122, which may include local area networks (LANs), the internet or online services, via direct connections or via modem.

Figure 4:
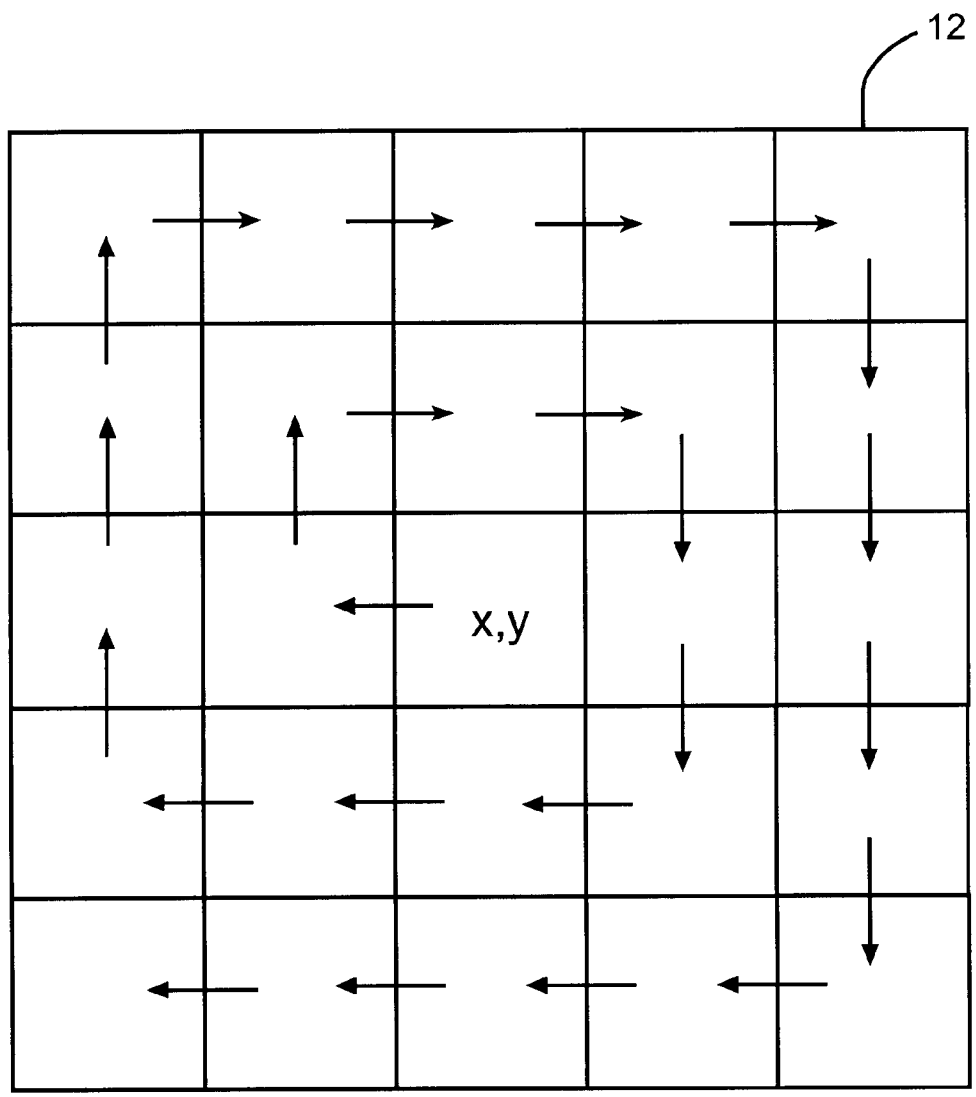
FIG. 4 is a schematic diagram showing the order in which tiled image data is transmitted and displayed in accordance with the invention.

In accordance with the invention, an algorithm is provided that enables the tile containing the specified x, y coordinates to be extracted and transmitted first by the server 25 and decompressed and displayed first on client computer 21, 22 and/or 23. The surrounding tiles are then extracted, transmitted, decompressed and displayed in non-overlapping spiral order, as indicated on the tiled map image 12 shown in FIG. 4. Thus, the tile containing the x, y coordinates (which is the tile containing the most pertinent information) is viewable on the client computer almost immediately after the server receives the request, thereby providing useful information to the driver of the vehicle without delay. The surrounding tiles then come into view in spiral order providing additional information concerning peripheral areas.

Figure 5:
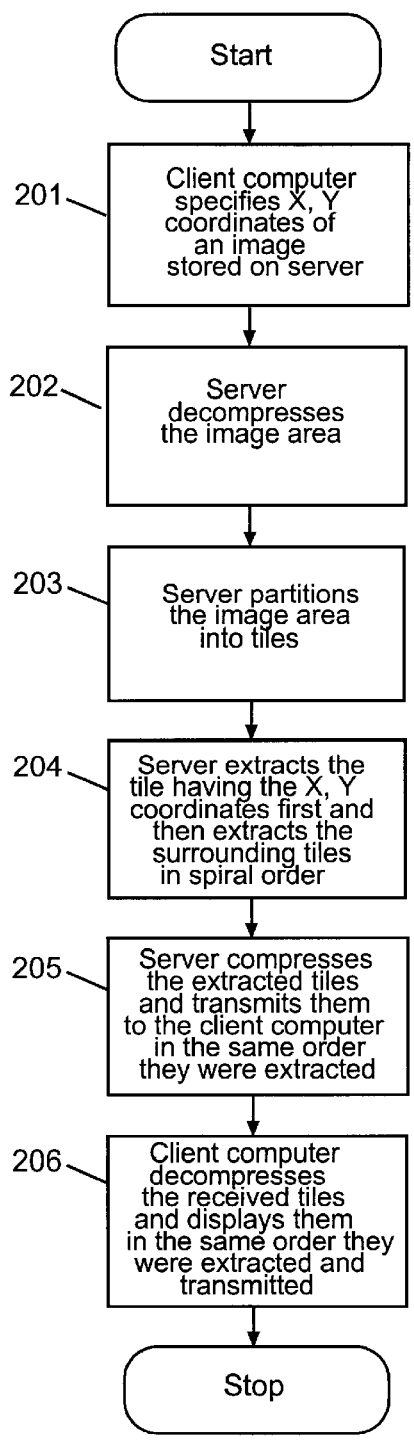
FIG. 5 is a flow chart illustrating the algorithm of the present invention.

The underlying algorithm of the present invention is shown by way of a flow chart in FIG. 5. In step 201, the client computer user requests a portion of an image stored on the server by specifying x, y coordinates defining a particular location in the image and transmits this information to the server. For example, the server may store a map of the entire United States and the client computer user may wish to access only a portion of that map. Upon receiving the specified x, y coordinates, the server decompresses the image to extract the image area needed by the client and centered at the specified x, y coordinates in step 202. The server then partitions the decompressed image area into non-overlapping tiles in step 203. In step 204, the server first extracts the tile with the location defined by the x, y coordinates and then extracts a certain number of surrounding tiles in spiral order. These extracted tiles are recompressed by the server and transmitted to the client computer in the same order that they were extracted. Upon receiving the tiles, in step 206 the client computer decompresses and displays them in the same order they were extracted and transmitted. That is, the tile having the location defined by x, y coordinates is decompressed and displayed first followed by the surrounding tiles in non-overlapping spiral order.

While the invention has been described in conjunction with specific embodiments, it will be evident to those skilled in the art in light of the foregoing description that many further alternatives, modifications and variations are possible. Accordingly, the invention described herein is intended to embrace all such alternatives, modifications, applications and variations as may fall within the spirit and scope of the appended claims.

What is claimed is:

1. A method of delivering image data from a storage system to a display, comprising the steps of:
   requesting, for display, at least a portion of an image stored in the storage system by specifying coordinates defining a location in at least the portion of the image requested;
   partitioning at least the portion of the image requested into a plurality of non-overlapping tiles including a first tile containing the location defined by the specified coordinates and a plurality of surrounding tiles; and
   displaying at least the portion of the image requested, wherein the first tile is displayed first followed by the display of the plurality of surrounding tiles in a non-overlapping spiral order.

2. The method of claim 1, wherein the first tile is a middle tile of at least the portion of the image.

3. The method of claim 1, further comprising the step of:
   decompressing the image data stored in the storage system before partitioning at least the portion of the image.

4. The method of claim 3, further comprising the step of:
   extracting the first tile and a plurality of surrounding tiles, after partitioning at least the portion of the image, wherein the first tile is extracted first followed by the plurality of surrounding tiles in spiral order.

5. A computer system including a processor and a memory having a computer-readable program code embodied therein for causing the processor to display at least a portion of an image stored in a storage system by performing the steps of:
   requesting, for display, at least the portion of an image stored in the storage system by specifying coordinates defining a location in at least the portion of the image requested;
   partitioning at least the portion of the image requested into a plurality of non-overlapping tiles including a first tile containing the location defined by the specified coordinates and a plurality of surrounding tiles; and displaying at least the portion of the image requested, wherein the first tile is displayed first followed by the display of the plurality of surrounding tiles in a non-overlapping spiral order.

6. The computer system of claim 5, wherein the first tile is a middle tile of at least the portion of the image.

7. The computer system of claim 5, further comprising the step of:

decompressing at least the portion of the image before partitioning at least the portion of the image.

8. The computer system of claim 7, further comprising the step of:

extracting the first tile and a plurality of surrounding tiles, after partitioning at least the portion of the image, wherein the first tile is extracted first followed by the plurality of surrounding tiles in spiral order.

9. A computer-usable medium having a computer-readable program code embodied therein for causing a computer to display at least a portion of an image stored in a storage system by performing the steps of:

requesting, for display, at least a portion of an image stored in the storage system by specifying coordinates defining a location in at least the portion of the image requested;

partitioning at least the portion of the image requested into a plurality of non-overlapping tiles including a first tile containing the location defined by the specified coordinates and a plurality of surrounding tiles; and displaying at least the portion of the image requested, wherein the first tile is displayed first followed by the display of the plurality of surrounding tiles in a non-overlapping spiral order.

10. The computer usable medium of claim 9, wherein the first tile is a middle tile of at least the portion of the image.

11. The computer usable medium of claim 9, wherein the computer is further caused to perform the step of:

decompressing at least the portion of the image before partitioning at least the portion of the image.

12. The computer usable medium of claim 11, wherein the computer is further caused to perform the step of:

extracting the first tile and a plurality of surrounding tiles, after partitioning at least the portion of the image, wherein the first tile is extracted first followed by the plurality of surrounding tiles in spiral order.

13. A client-server computer system, comprising:

a server having an image stored therein; and at least one client computer connected to the server through a network;

wherein a signal is sent from the client computer to the server requesting, for display on the client computer, at least a portion of the image stored in the server by specifying coordinates defining a location in the image;

wherein the server partitions at least the portion of the image requested into a plurality of non-overlapping tiles including a first tile containing the location defined by the specified coordinates and a plurality of surrounding tiles; and wherein the client computer displays at least the portion of the image requested by displaying the first tile first followed by the display of the plurality of surrounding tiles in a non-overlapping spiral order.

\* \* \* \* \*